No. 673,159. Patented Apr. 30, 1901.
G. F. DICKSON & E. E. BOWER.
HORSESHOE NAIL CLENCHING TOOL.
(Application filed Feb. 2, 1901.)

(No Model.)

WITNESSES:

INVENTORS:
G. F. Dickson
E. E. Bower
BY
ATTORNEYS.

UNITED STATES PATENT OFFICE.

GEORGE F. DICKSON AND ELLSWORTH E. BOWER, OF ALEDO, ILLINOIS.

HORSESHOE-NAIL-CLENCHING TOOL.

SPECIFICATION forming part of Letters Patent No. 673,159, dated April 30, 1901.

Application filed February 2, 1901. Serial No. 45,706. (No model.)

*To all whom it may concern:*

Be it known that we, GEORGE F. DICKSON and ELLSWORTH E. BOWER, citizens of the United States, residing at Aledo, in the county of Mercer and State of Illinois, have invented certain new and useful Improvements in Clenching-Tools; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a novel device designed for use in clenching upon the outside of the hoof of an animal the ends of the nails securing a shoe to said hoof.

The primary object of the invention is to provide a hand device having a rotary part adapted to engage the ends of the horseshoe-nail or the like and when rotated bend the end of said nail downwardly to clench the same.

The invention further relates to the provision of a pinch-handle device provided with one member adapted to engage beneath the hoof to prevent the nail from being forced outwardly and with means adapted to engage the point of the nail and clench the same.

In the accompanying drawings, forming part hereof, an embodiment of the invention is illustrated, and from said drawings, taken in connection with the detailed description and appended claim hereinafter, many improved details in the construction and arrangement of the several parts of the device will be apparent.

In said drawings like letters of reference will refer to corresponding parts in both views.

Figure 1:
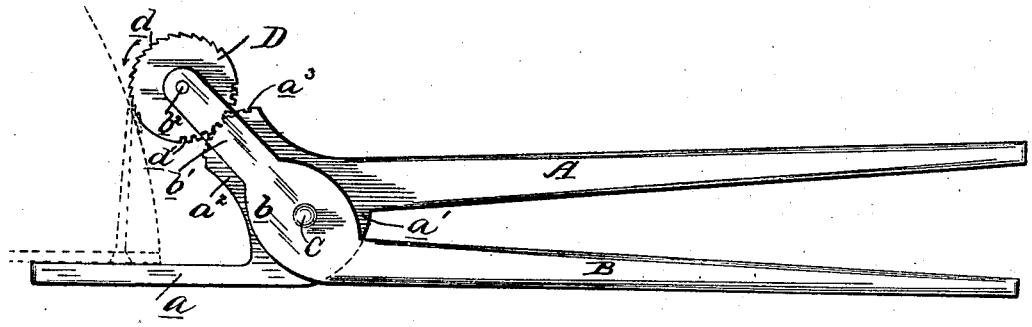
Figure 2:
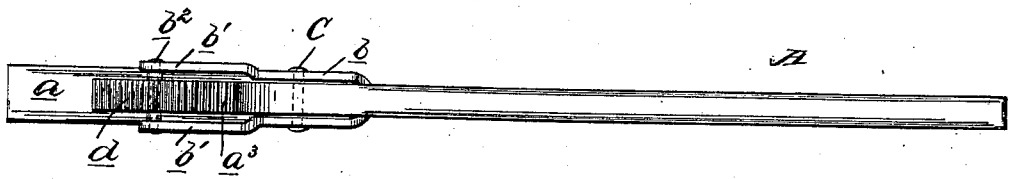

Figure 1 is an elevation of the complete device, the same being shown in operative position applied to the hoof of an animal, the latter being indicated by dotted lines; and Fig. 2 is a top plan view of the device.

Referring more specifically to the drawings, A and B designate oppositely-disposed members pivoted together at C, so as to constitute pinch-handles like any of the more ordinary pinchers, pliers, and the like. The member A has the forwardly-extending arm or strip $a$, adapted normally to occupy a plane somewhat below that of the member A and connected thereto by the upwardly-extending portion $a'$. This member A is also provided with the projection $a^2$, arranged at an incline relative thereto and toothed at its outer end $a^3$ for purposes to be hereinafter referred to. The member B has a bifurcated portion $b$, adapted to overlie the portion $a'$ of the member A, and also the inclined extensions $b'$, arranged at approximately the same incline as the extension $a^2$, heretofore designated. Between the extensions $b'$ upon a pivot-bolt $b^2$ is secured a rotary member or what we may term a "clencher-disk" D, the same having the serrated or roughened edge $d$ and the teeth $d'$, the latter being so arranged as to mesh with the corresponding teeth $a^3$ on the projection $a^2$ to rotate the clencher-disk.

From the above description the operation of the device may now be defined. The tool or device being grasped by the hand of the operator, the members A and B being temporarily retained in separated position, the arm or strip $a$ is projected beneath the hoof of an animal and in engagement with the head of the nail the end of which is to be clenched. The members A and B being then pinched or forced together, the teeth on the projection $a^2$ by engaging those of the clencher-disk D will rotate said clencher-disk in the direction of the arrow, thereby causing the teeth or roughened periphery thereof to engage the projecting end or point of the nail and bend the same down upon the hoof to clench the same in a manner shown in Fig. 1.

While a particular construction has been shown herein, it is to be understood that the invention is broad in its nature and that various changes may be made in the arrangement and construction of the various details and arrangement without in the least departing from the spirit of the invention.

Having thus described the invention, what is claimed as new, and desired to be secured by Letters Patent, is—

A clenching-tool comprising two operating members pivotally secured together, an elongated arm or support integral with the upper member adapted to be projected beneath the hoof of an animal, a toothed projection also integral with the upper member intermediate the handle and arm portions thereof, a bifurcated extension on the lower member overlying the upper member, and a toothed clencher supported in the ends of the bifurcated portion adapted to mesh with the toothed projection on the upper member, substantially as described.

In testimony whereof we affix our signatures in presence of two witnesses.

GEORGE F. DICKSON.
ELLSWORTH E. BOWER.

Witnesses:
WM. McHARD,
GEO. A. COOKE.